(12) United States Patent
Yamada et al.

(10) Patent No.: US 9,128,538 B2
(45) Date of Patent: Sep. 8, 2015

(54) OPTICAL FILM, DISPLAY PANEL, AND DISPLAY DEVICE

(71) Applicant: PANASONIC CORPORATION, Osaka (JP)

(72) Inventors: Kazuhiro Yamada, Osaka (JP); Yosuke Asai, Osaka (JP); Hiroshi Yamaguchi, Osaka (JP); Takashi Yamada, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/099,256

(22) Filed: Dec. 6, 2013

(65) Prior Publication Data

US 2014/0093708 A1 Apr. 3, 2014

Related U.S. Application Data

(63) Continuation of application No. PCT/JP2013/002652, filed on Apr. 19, 2013.

(30) Foreign Application Priority Data

Apr. 26, 2012 (JP) ................................. 2012-101124
Jul. 30, 2012 (JP) ................................. 2012-167975

(51) Int. Cl.
*G06F 3/0354* (2013.01)
*G06F 3/041* (2006.01)
*G06F 3/042* (2006.01)

(52) U.S. Cl.
CPC .............. *G06F 3/0354* (2013.01); *G06F 3/041* (2013.01); *G06F 3/042* (2013.01); *Y10T 428/24868* (2015.01)

(58) Field of Classification Search
CPC ..................... Y10T 428/24868; G06F 3/0345; G06F 3/03545; G06F 3/041; G06F 3/042; G06K 19/06009
See application file for complete search history.

(56) References Cited

U.S. PATENT DOCUMENTS

2004/0095337 A1 5/2004 Pettersson et al.
2004/0113898 A1 6/2004 Pettersson et al.
(Continued)

FOREIGN PATENT DOCUMENTS

JP 2006-141061 A 6/2006
JP 2007-226577 A 9/2007
(Continued)

OTHER PUBLICATIONS

International Search Report issued in International Application No. PCT/JP2013/002652 with Date of mailing Jun. 11, 2013.

*Primary Examiner* — Elizabeth Mulvaney
(74) *Attorney, Agent, or Firm* — McDermott Will & Emery LLP

(57) ABSTRACT

An optical film 40 includes a sheet-shaped base material 41; an information pattern including a plurality of marks 42 provided on one surface of the base material 41 and representing information regarding a position thereof on the optical film 40; and a sheet member 43 laminated on the surface of the base material 41 on which the information pattern is provided, so as to fill spaces between the plurality of marks 42. When visible light having a wavelength of 700 nm is transmitted through the information pattern in a thickness direction of the information pattern, a phase difference between light transmitted through each mark 42 and light transmitted through the sheet member 43 between the marks 42 is equal to or less than Π/6.

8 Claims, 14 Drawing Sheets

(56) References Cited

U.S. PATENT DOCUMENTS

| | | |
|---|---|---|
| 2005/0104861 A9 | 5/2005 | Pettersson et al. |
| 2006/0076416 A1 | 4/2006 | Pettersson |
| 2007/0290047 A1* | 12/2007 | Tazaki et al. .................. 235/491 |
| 2008/0233360 A1* | 9/2008 | Sekine et al. ............... 428/195.1 |
| 2009/0279170 A1* | 11/2009 | Miyazaki et al. ............. 359/488 |
| 2010/0096458 A1 | 4/2010 | Pettersson et al. |
| 2012/0015144 A1 | 1/2012 | Itoh et al. |
| 2012/0193419 A1 | 8/2012 | Pettersson et al. |

FOREIGN PATENT DOCUMENTS

| | | |
|---|---|---|
| JP | 2008-026958 A | 2/2008 |
| JP | 2009-037312 A | 2/2009 |
| JP | 2009-037313 A | 2/2009 |
| JP | 2011-073353 A | 4/2011 |
| JP | 2012-013745 A | 1/2012 |
| WO | 2010/073797 A1 | 7/2010 |

* cited by examiner

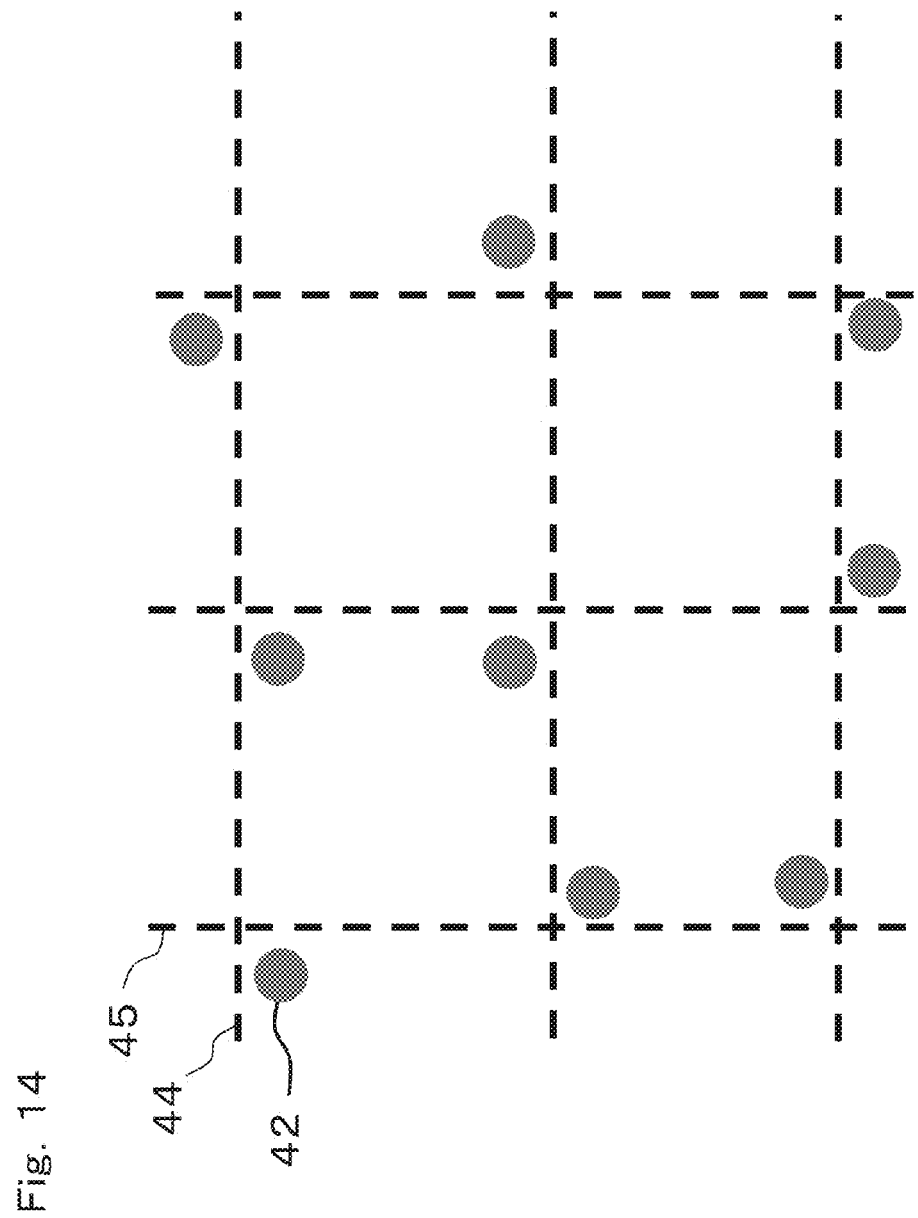

OPTICAL FILM, DISPLAY PANEL, AND DISPLAY DEVICE

RELATED APPLICATIONS

This application is Continuation Application of International Application No. PCT/JP2013/002652, filed on Apr. 19, 2013, which in turn claims the benefit of Japanese Application No. 2012-101124, filed on Apr. 26, 2012 and Japanese Application No. 2012-167975, filed on Jul. 30, 2012, the disclosures of which are incorporated by reference herein.

BACKGROUND

1. Field

The present disclosure relates to an optical film on which an information pattern is formed, etc.

2. Description of the Related Art

A technology is known in which when characters or the like are written on paper with a pen, the information written on the paper is computerized and transmitted to a server or a terminal (Japanese Laid-Open Patent Publication No. 2007-226577).

In addition, in recent years, a system has been developed in which a handwriting input is enabled on a display surface of a digital display using a digital pen. In such a system, an information pattern composed of dots or the like is formed on the display surface.

As such a system, a character image display system is known in which a transparent sheet on which a transparent pattern capable of providing position information to input track reading means is printed is mounted on the front surface of a display (Japanese Laid-Open Patent Publication No. 2009-037312). In the transparent sheet, a transparent layer is formed with a thickness that is substantially the same as that of the transparent pattern or with such a thickness that the transparent layer covers the transparent pattern.

SUMMARY

However, there is a problem that it becomes hard to view an image or characters displayed on the display surface, since the information pattern is formed on the display surface.

Therefore, the present disclosure provides an optical film on which an information pattern is formed and which improves visibility of an image through the optical film.

An optical film that solves the above problem includes: a sheet-shaped base material; an information pattern including a plurality of marks provided on one surface of the base material and representing information regarding a position thereof on the optical film; and a sheet member laminated on the surface of the base material on which the information pattern is provided, so as to fill spaces between the plurality of marks. When visible light having a wavelength of 700 nm is transmitted through the information pattern in a thickness direction of the information pattern, a phase difference between light transmitted through each mark and light transmitted through the sheet member between the marks is equal to or less than $\Pi/6$.

In addition, another optical film that solves the above problem includes: a sheet-shaped base material; an information pattern including a plurality of marks provided on one surface of the base material and representing information regarding a position thereof on the optical film; and a sheet member laminated on the surface of the base material on which the information pattern is provided, so as to fill spaces between the plurality of marks. A difference between a refractive index of each mark and a refractive index of the sheet member is equal to or less than 0.005.

According to each optical film described above, it is possible to improve visibility of an image through the optical film.

BRIEF DESCRIPTION OF THE DRAWINGS

FIG. 9($b$) is a graph for explaining a relationship between a phase difference of light and an intensity of a Becke line;

FIG. 14 is a schematic diagram showing another example of the dot pattern.

DETAILED DESCRIPTION

Hereinafter, embodiments will be described in detail with reference to the drawings as appropriate. However, there will be instances in which detailed description beyond what is necessary is omitted. For example, detailed description of subject matter that is previously well-known, as well as redundant description of components that are substantially the same will in some cases be omitted. This is to prevent the following description from being unnecessarily lengthy, in order to facilitate understanding by a person of ordinary skill in the art.

The inventor provides the following description and the accompanying drawings in order to allow a person of ordinary skill in the art to sufficiently understand the present disclosure, and the description and the drawings are not intended to restrict the subject matter of the scope of the patent claims.

Hereinafter, the embodiments will be described in detail with reference to the drawings.

Embodiment 1

[1. Outline of Display Control System]

Figure 1:
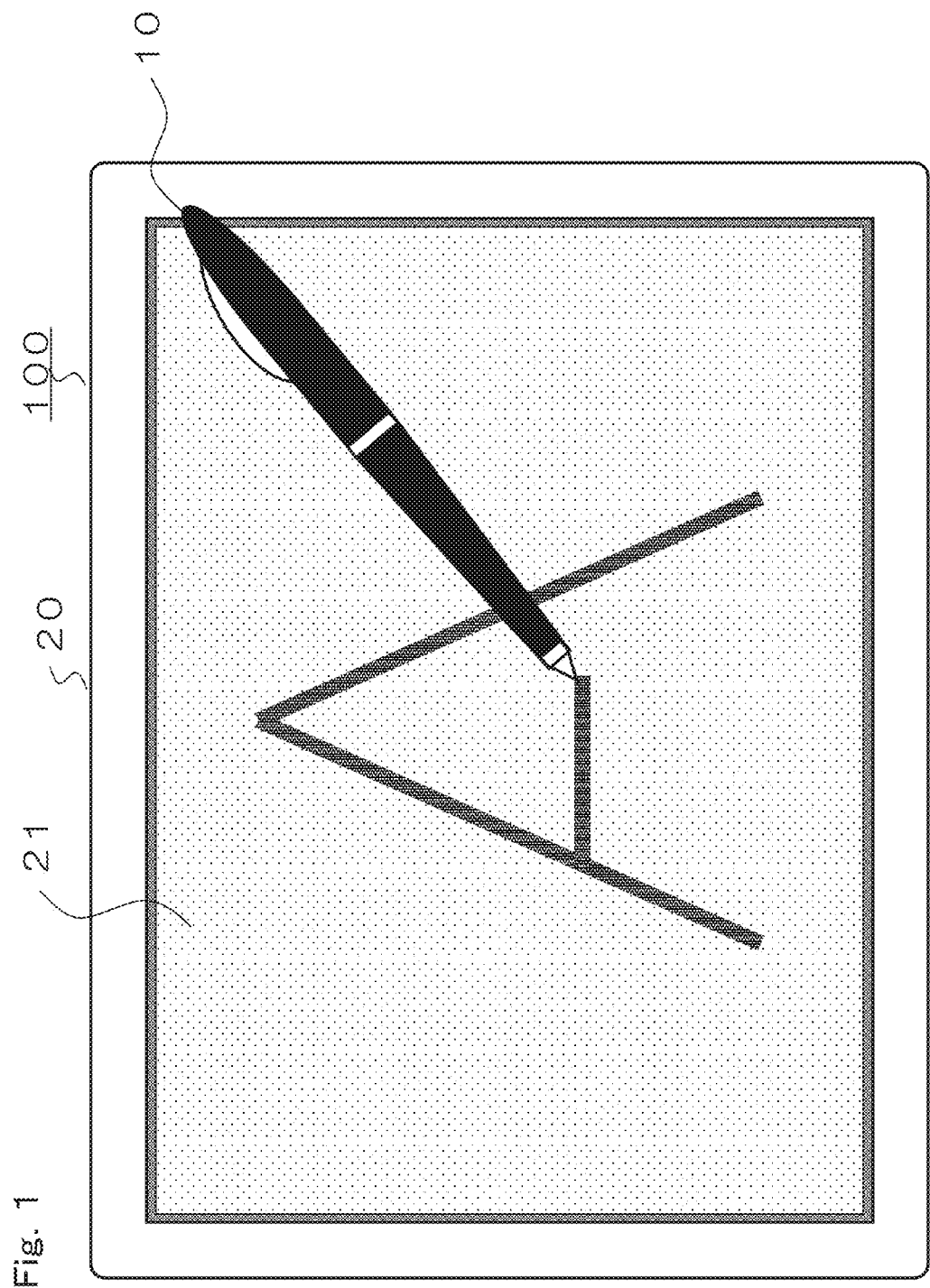
FIG. 1 is a schematic diagram showing a situation where a user uses a display control system 100.

FIG. 1 is a schematic diagram showing the appearance of a display control system 100 according to the present embodiment. The display control system 100 includes an optical digital pen (hereinafter, referred to merely as "digital pen") 10 and a display device 20. Although described in detail later, the display device 20 is a liquid crystal display capable of displaying various images on a display panel 21. In addition, the display device 20 is provided with dot patterns each representing information regarding a position on the display panel 21. The digital pen 10 detects information regarding a position of the tip of the digital pen 10 on the display panel 21 (hereinafter, also referred to as "position information") by optically reading a dot pattern, and transmits the position information to the display device 20. The display device 20 receives the position information as an input and performs various display control.

For example, when the tip of the digital pen 10 is moved on the display panel 21, the digital pen 10 detects continuous position information as a trajectory of the tip of the digital pen 10 from continuously read dot patterns. The display device 20 continuously displays spots on the display panel 21 in accordance with the trajectory of the tip of the digital pen 10. By so doing, it is possible to perform a handwriting input of a character, a figure, or the like on the display panel 21 by using the digital pen 10. Or the display device 20 continuously deletes spots displayed on the display panel 21, in accordance with the trajectory of the tip of the digital pen 10. By so doing, it is possible to delete a character, a figure, or the like on the display panel 21 by using the digital pen 10 like an eraser. In other words, the digital pen 10 serves as a reading device and also serves as an input device that performs an input to the display control system 100.

[2. Configuration of Display Device]

Figure 2:
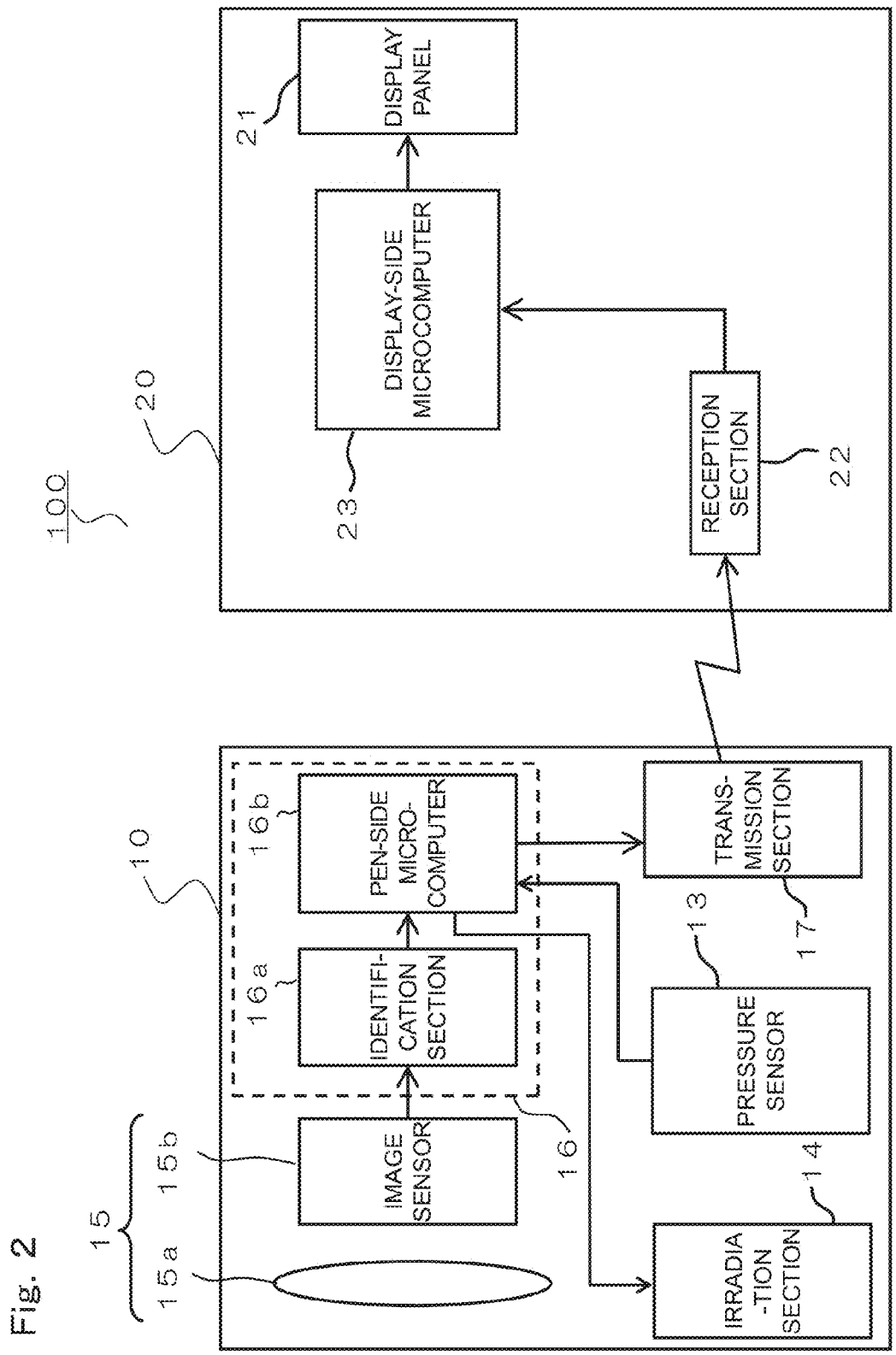
FIG. 2 is a block diagram of the display control system 100.

Hereinafter, the display device 20 will be described. FIG. 2 is a block diagram showing a schematic configuration of the display control system 100.

The display device 20 includes a reception section 22 that receives a signal from an external device, a display-side microcomputer 23 that controls the entirety of the display device 20, and the display panel 21 that displays an image.

Although described in detail later, the reception section 22 receives a signal transmitted from the digital pen 10. The signal received by the reception section 22 is transmitted to the display-side microcomputer 23.

The display-side microcomputer 23 is composed of a CPU, a memory, and the like. The display-side microcomputer 23 is provided with a program for causing the CPU to operate. For example, the display-side microcomputer 23 controls the display panel 21 on the basis of a signal transmitted from the digital pen 10 and changes a content displayed on the display panel 21.

Figure 3:
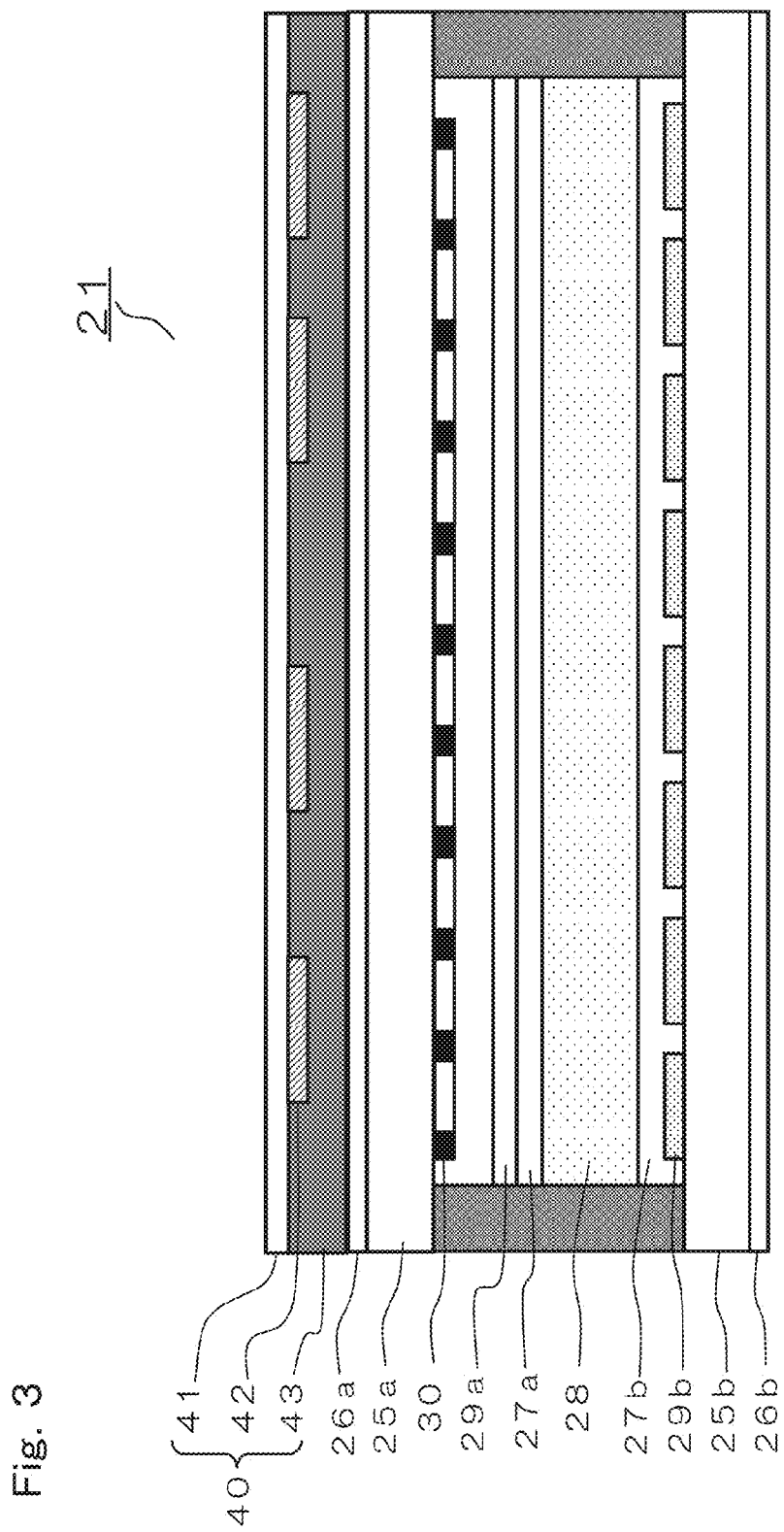
FIG. 3 is a cross-sectional view of a display panel 21.

FIG. 3 is a schematic cross-sectional view of the display panel 21. The display panel 21 is a liquid crystal panel. The basic configuration of the display panel 21 is the same as the configuration of a general liquid crystal panel, except an optical film 40. Specifically, the display panel 21 includes a pair of glass substrates 25a and 25b; a pair of polarizing filters 26a and 26b provided on outer surfaces of the respective glass substrates 25a and 25b; a pair of alignment films 27a and 27b provided between the pair of glass substrates 25a and 25b; a liquid crystal layer 28 provided between the pair of alignment films 27a and 27b; transparent electrodes 29a and 29b provided on the respective alignment films 27a and 27b; a color filter 30 provided between the glass substrate 25a and the transparent electrode 29a at the front side; and the optical film 40. A display area that displays an image is formed in a front surface of the display panel 21. The color filter 30 is composed of, for example, a black matrix and a plurality of pixel regions (not shown). Each pixel region includes, for example, a red (R) sub-pixel, a green (G) sub-pixel, and a blue (B) sub-pixel.

The optical film 40 includes a PET film 41 as a base material, dot patterns composed of a plurality of dots 42, and a sheet member 43.

The plurality of dots 42 are arranged on a back surface (a lower surface in FIG. 3) of the PET film 41. Each dot 42 projects from the back surface of the PET film 41 by its thickness. One dot pattern is formed of a set of dots 42 within a unit area 50 described later. On the PET film 41, a plurality of dot patterns are formed. Each dot pattern is an example of an information pattern representing information regarding the position of the dot pattern on the optical film 40 (the display panel 21). Each dot 42 is an example of a mark. In addition, the PET film 41 is an example of a base material.

The sheet member 43 is laminated on the back surface of the PET film 41 so as to fill the spaces between the plurality of dots 42. More specifically, the sheet member 43 is formed so as to cover the back surface of the PET film 41 and the surfaces of the plurality of dots 42. The sheet member 43 is formed, for example, over the entirety of the back surface of the PET film 41. A back surface of the sheet member 43 is a flat surface. The material of the dots 42 and the material of the sheet member 43 will be described later.

It should be noted that in the present embodiment, the optical film 40 is formed on the polarizing filter 26a located at a front side of the liquid crystal layer 28. However, the position at which the optical film 40 is formed is not limited thereto. For example, the optical film 40 may be formed between the polarizing filter 26a and the substrate 25a. Alternatively, at a back side of the liquid crystal layer 28, the optical film 40 may be formed on a lower surface of the polarizing filter 26b or may be formed between the polarizing filter 26b and the substrate 25b.

The display device 20 also includes, for example, a backlight unit that applies light from a back side of the display panel 21 to the display panel 21. The backlight unit includes, at a back side of its light source, a diffuse reflection sheet that diffusely reflects light incident thereon from a front side of the display panel 21.

[3. Configuration of Digital Pen]

Figure 4:
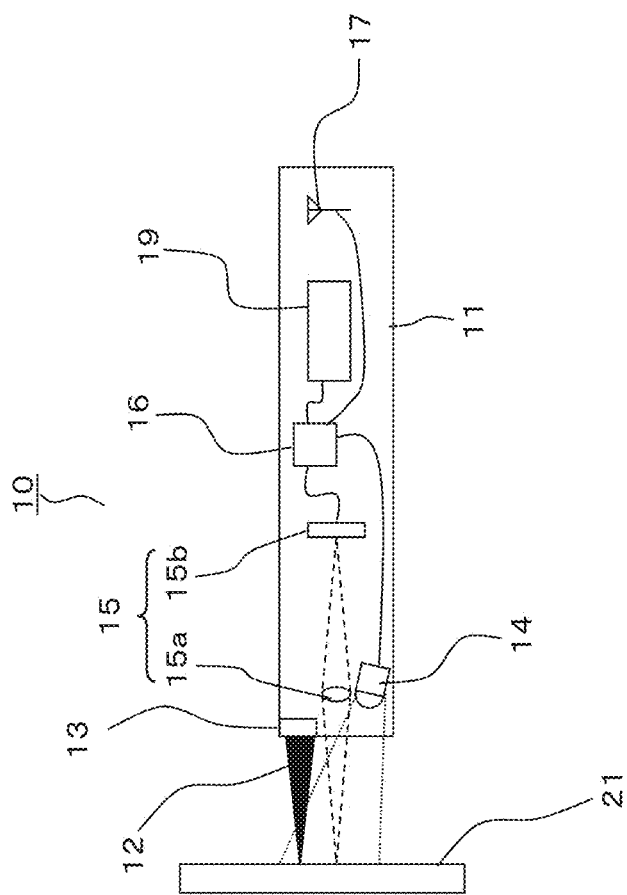
FIG. 4 is a cross-sectional view showing a schematic configuration of a digital pen 10.

Next, a detailed configuration of the digital pen 10 will be described. FIG. 4 is a cross-sectional view showing a schematic configuration of the digital pen 10.

The digital pen 10 includes a cylindrical body case 11, a pen tip portion 12 that is attached to an end of the body case 11, a pressure sensor 13 that detects a pressure applied to the pen tip portion 12, an irradiation section 14 that emits infrared light, a reading section 15 that optically reads infrared light incident thereon, a control section 16 that controls the digital pen 10, a transmission section 17 that outputs a signal to an external device, and a power supply 19 that supplies power to each component of the digital pen 10.

The body case 11 has an outer shape similar to that of a general pen and is formed in a cylindrical shape. The pen tip portion 12 is formed in a tapered shape. The tip of the pen tip portion 12 is rounded to such an extent that the tip does not damage the surface of the display panel 21. It should be noted that the pen tip portion 12 preferably has such a shape that the user is allowed to easily recognize an image displayed on the display panel 21.

The pressure sensor 13 is provided within the body case 11 and is connected to a base portion of the pen tip portion 12. The pressure sensor 13 detects a pressure applied to the pen tip portion 12 and transmits the detection result to the control section 16. Specifically, the pressure sensor 13 detects a pressure applied from the display panel 21 to the pen tip portion 12 when the user writes a character or the like on the display panel 21 with the digital pen 10. In other words, the pressure sensor 13 is used when it is determined whether the user intends to perform an input with the digital pen 10.

The irradiation section 14 is provided in an end portion of the body case 11 near the pen tip portion 12. The irradiation section 14 is composed of, for example, an infrared LED. The irradiation section 14 is provided so as to emit infrared light from the end of the body case 11.

The reading section 15 includes an objective lens 15a and an image sensor 15b. The objective lens 15a causes light, incident thereon from the pen tip side, to form an image on the image sensor 15b. The objective lens 15a is provided in the end portion of the body case 11 and near the pen tip portion 12. Here, when infrared light is emitted from the irradiation section 14 in a state where the tip of the digital pen 10 is directed to the display surface of the display device 20, the infrared light passes through the display panel 21 and is diffusely reflected on the diffuse reflection sheet located on the back side of the display panel 21. As a result, regardless of the angle of the digital pen 10, part of the infrared light having passed through the display panel 21 returns to the digital pen 10 side. The infrared light that is emitted from the irradiation section 14 and diffusely reflected on the display device 20 is incident on the objective lens 15a. The image sensor 15b is provided on the optical axis of the objective lens 15a. Thus, the infrared light having passed through the objective lens 15a is caused to form an image on an imaging surface of the image sensor 15b. The image sensor 15b outputs, to the control section 16, an image signal obtained by converting the optical image formed on the imaging surface to an electrical signal. The image sensor 15b is composed of, for example, a CCD image sensor or a CMOS image sensor. Although described in detail later, the dot patterns are formed from a material that absorbs infrared light (a material having a low transmittance for infrared light). Thus, almost no infrared light returns from the dots 42 of the dot patterns to the digital pen 10. On the other hand, a more amount of infrared light returns from the region between each dot 42 than from the region of each dot 42. As a result, an optical image in which a dot pattern is represented in black is captured by the image sensor 15b.

As shown in FIG. 2, the control section 16 includes an identification section 16a and a pen-side microcomputer 16b. The identification section 16a identifies position information of the digital pen 10 on the display panel 21 on the basis of an image signal from the reading section 15. Specifically, the identification section 16a obtains the pattern shape of a dot pattern from an image signal obtained by the reading section 15, and identifies a position, on the display panel 21, of the pen tip portion 12 on the basis of the pattern shape. Information regarding the position of the pen tip portion 12 which is identified by the identification section 16a is transmitted to the pen-side microcomputer 16b. The pen-side microcomputer 16b controls the entirety of the digital pen 10. The pen-side microcomputer 16b is composed of a CPU, a memory, and the like and is provided with a program for causing the CPU to operate.

The transmission section 17 transmits a signal to an external device. Specifically, the transmission section 17 wirelessly transmits the position information identified by the identification section 16a, to an external device. The transmission section 17 performs short-distance wireless communication with the reception section 22 of the display device 20. The transmission section 17 is provided in an end portion of the body case 11 which is opposite to the pen tip portion 12.

[4. Details of Dot Patterns]

Hereinafter, the dot patterns will be described in detail.

Figure 5:
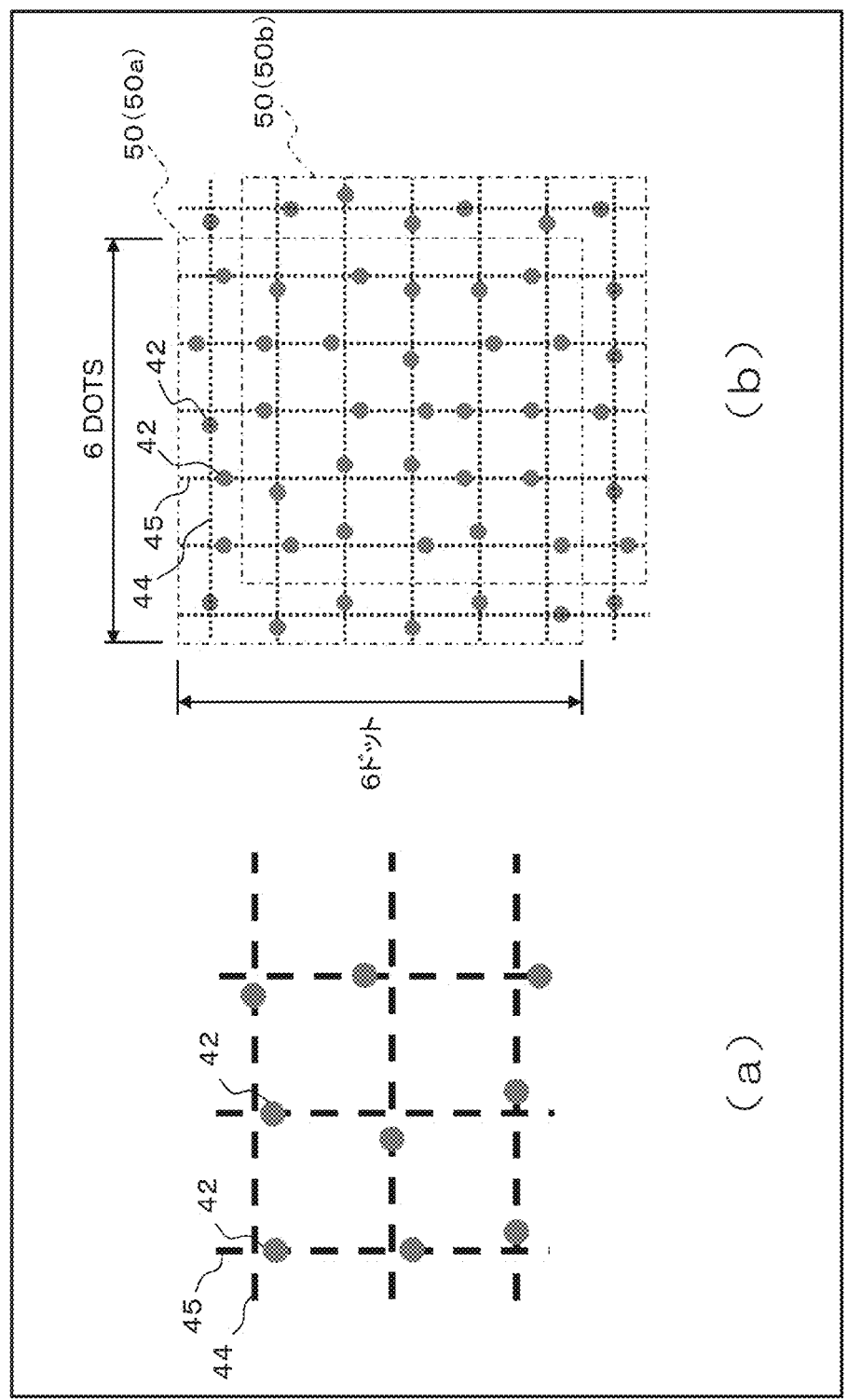
FIG. 5 is an enlarged view of an optical film 40 for explaining a dot pattern.

The dot patterns will be described with reference to FIG. 5. FIG. 5 is an enlarged view when the optical film 40 is seen from the front. In FIGS. 5(a) and 5(b), for explaining the position of each dot 42 of each dot pattern, first reference lines 44 and second reference lines 45 are shown as virtual lines (lines that do not actually exist on the optical film 40) on the optical film 40. The first reference lines 44 and the second reference lines 45 are perpendicular to each other. In FIG. 5, a grid is formed of a plurality of the first reference lines 44 and a plurality of the second reference lines 45.

Figure 6:
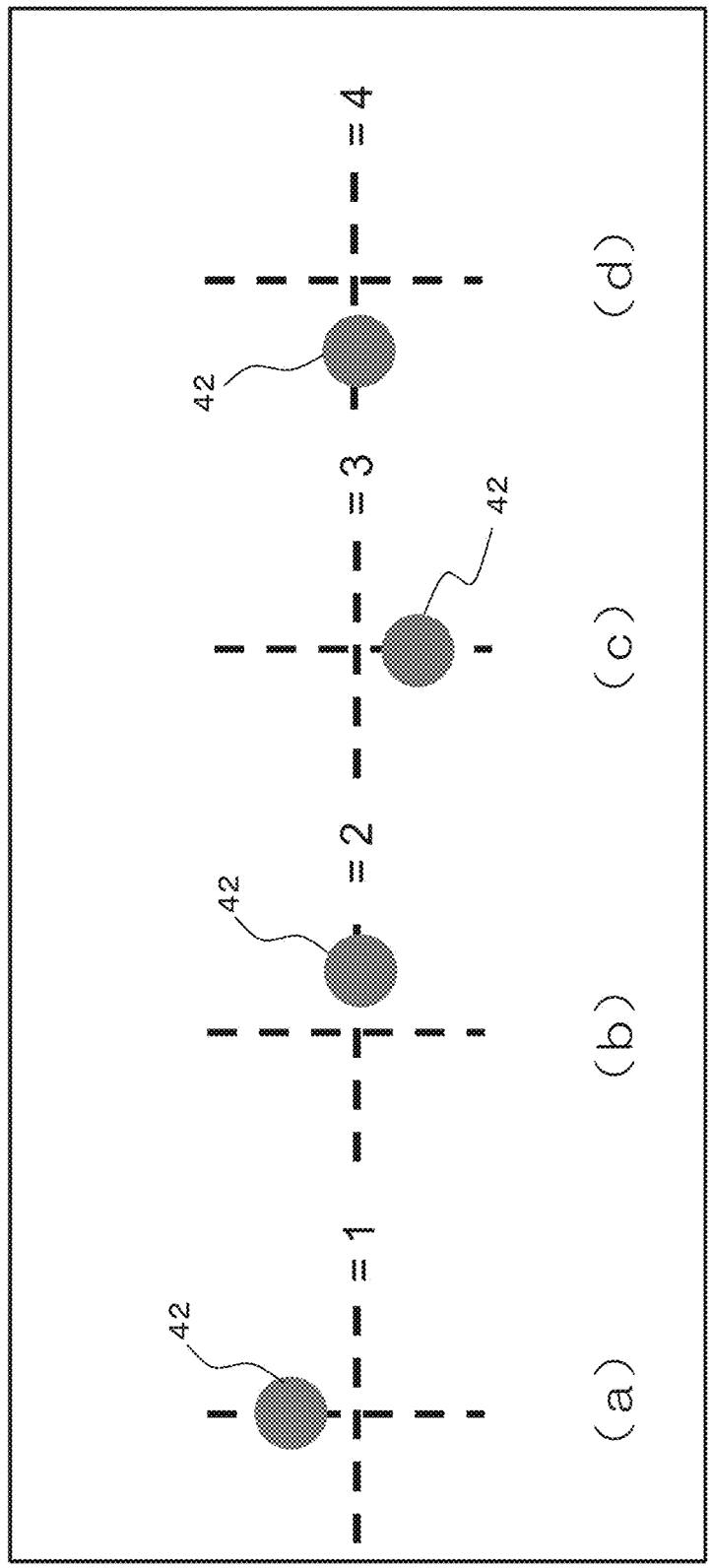
FIG. 6 is a schematic diagram for explaining that information obtained by numeric conversion of the position of a dot 42 is different depending on the position of the dot 42.

Each dot 42 is arranged around the intersection of the first reference line 44 and the second reference line 45. In other words, each dot 42 is arranged near each grid point. FIG. 6 is a diagram showing arrangement patterns of each dot 42. Where the direction in which each first reference line 44 extends is an X direction and the direction in which each second reference line 45 extends is a Y direction, each dot 42 is arranged at a position off-set (shifted) from the intersection of the first reference line 44 and the second reference line 45 along the X direction or the Y direction toward the plus side or the minus side. Specifically, on the optical film 40, each dot 42 is arranged as shown in any of FIGS. 6(a) to 6(d). In the arrangement of FIG. 6(a), the dot 42 is arranged at a position above the intersection of the first reference line 44 and the second reference line 45. This arrangement is represented by "1" when numeric conversion is performed thereon. In the arrangement of FIG. 6(b), the dot 42 is arranged at a position on the right side of the intersection of the first reference line 44 and the second reference line 45. This arrangement is represented by "2" when numeric conversion is performed thereon. In the arrangement of FIG. 6(c), the dot 42 is arranged at a position below the intersection of the first reference line 44 and the second reference line 45. This arrangement is represented by "3" when numeric conversion is performed thereon. In the arrangement of FIG. 6(d), the dot 42 is arranged at a position on the left side of the intersection of the first reference line 44 and the second reference line 45. This arrangement is represented by "4" when numeric conversion is performed thereon. Each dot 42 is represented by a number of "1" to "4" in the digital pen 10 in accordance with the arrangement pattern.

Then, as shown in FIG. 5(b), 6 dots×6 dots are set as one unit area 50, and one dot pattern is formed of the 36 dots 42 included in a unit area 50. By arranging each of the 36 dots 42, included in each unit area 50, at any of "1" to "4" shown in FIG. 6, it is possible to form a huge number of dot patterns having information different from each other. All the dot patterns (the dot patterns in the unit areas 50) on the optical film 40 are different from each other.

Information is added to each dot pattern on the optical film 40. Specifically, each dot pattern represents a position coordinate of each unit area 50. In other words, when the optical film 40 is divided in the unit areas 50 of 6 dots×6 dots, each dot pattern represents a position coordinate of the corresponding unit area 50. In FIG. 5(b), a dot pattern in an area 50a represents a position coordinate of the center position of the area 50a, and a dot pattern in an area 50b represents a position coordinate of the center position of the area 50b. When the pen tip moves diagonally downward right in FIG. 5(b), an area 50 read by the digital pen 10 is changed from the area 50a to the area 50b. As the method for patterning (coding) and coordinate transformation (decoding) of dot patterns as described above, for example, a publicly known method disclosed in Japanese Laid-Open Patent Publication No. 2006-141061 may be used.

[7. Operation]

Figure 7:
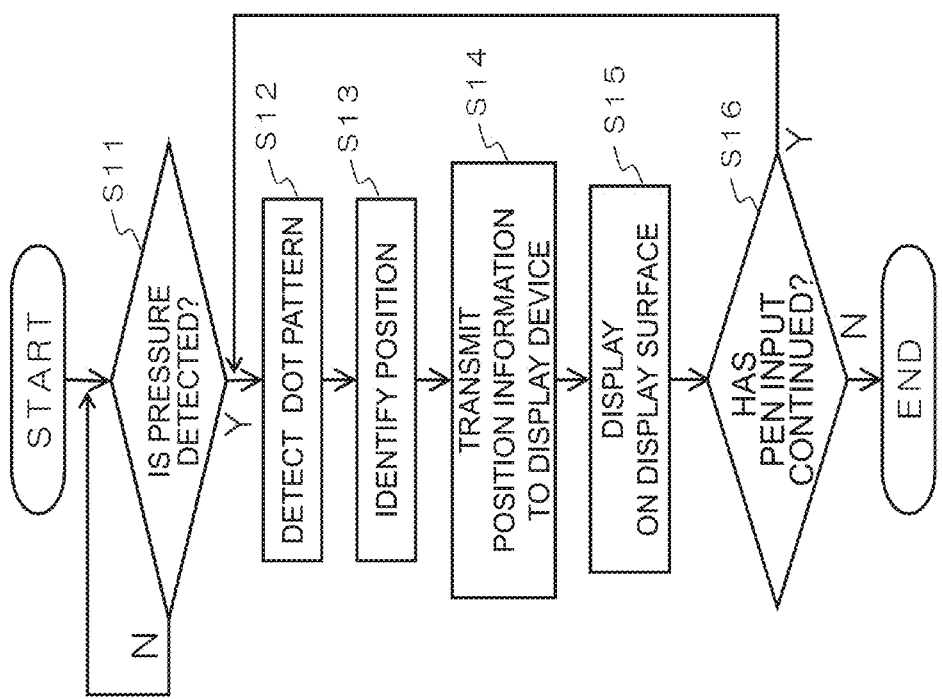
FIG. 7 is a flowchart showing flow of a process of the display control system 100.

Subsequently, an operation of the display control system 100 configured thus will be described. FIG. 7 is a flowchart showing flow of a process of the display control system 100. Hereinafter, a case will be described in which the user performs a pen input of (writes) a character on the display device 20 with the digital pen 10.

First, when the display control system 100 is powered on, the pen-side microcomputer 16b of the digital pen 10 starts monitoring a pressure applied to the pen tip portion 12 in step S11. The pressure detection is performed by the pressure sensor 13. When a pressure is detected by the pressure sensor 13 (Yes), the pen-side microcomputer 16b determines that the user is performing a pen input of a character or the like on the display panel 21 of the display device 20, and the process proceeds to step S12. While no pressure is detected by the pressure sensor 13 (while No continues), the pen-side microcomputer 16b repeats step S11. It should be noted that when the digital pen 10 is powered on, the irradiation section 14 starts emitting infrared light.

In step S12, the reading section 15 of the digital pen 10 detects a dot pattern formed in the display panel 21. Here, the infrared light emitted from the irradiation section 14 is diffusely reflected on the above-described diffuse reflection sheet, and part of the infrared light returns to the digital pen 10 side. Then, almost no infrared light returning to the digital pen 10 side passes through the dots 42 of the dot pattern. The infrared light having passed through the region between each dot 42 mainly reaches the objective lens 15a. Then, the infrared light is received by the image sensor 15b via the objective lens 15a. The objective lens 15a is arranged so as to receive reflected light from a position, on the display panel 21, which is pointed to by the pen tip portion 12. As a result, an image of the dot pattern at the position, on the display surface of the display panel 21, which is pointed to by the pen tip portion 12 is captured by the image sensor 15b. In this manner, the reading section 15 optically reads the dot pattern. An image signal obtained by the reading section 15 is transmitted to the identification section 16a.

In step S13, the identification section 16a obtains the pattern shape of the dot pattern from the image signal, and identifies the position of the pen tip on the display panel 21 on the basis of the pattern shape. Specifically, the identification section 16a obtains the pattern shape of the dot pattern by performing determined image processing on the obtained image signal. Subsequently, the identification section 16a determines which unit area 50 (unit area of 6 dots×6 dots) the pointed position is located at, from the arrangement of the dots 42 in the obtained pattern shape, and identifies the position coordinate (position information) of the unit area 50 from the dot pattern in the unit area 50. The identification section 16a transforms the dot pattern to the position coordinate by determined calculation corresponding to the method for coding of dot patterns. The identified position information is transmitted to the pen-side microcomputer 16b.

Subsequently, in step S14, the pen-side microcomputer 16b transmits the position information to the display device 20 via the transmission section 17.

The position information transmitted from the digital pen 10 is received by the reception section 22 of the display device 20. The received position information is transmitted from the reception section 22 to the display-side microcomputer 23. In step S15, upon reception of the position information, the display-side microcomputer 23 controls the display panel 21 so as to change a displayed content at a position, on the display area of the display panel 21, corresponding to the position information. In this example, because of character input, a spot is displayed at the position, on the display area of the display panel 21, corresponding to the position information.

Subsequently, in step S16, the pen-side microcomputer 16b determines whether the pen input performed by the user has continued. When the pressure sensor 13 detects a pressure, the pen-side microcomputer 16b determines that the pen input performed by the user has continued, and the process returns to step S12. Then, by repeating a flow of steps S12 to S16, spots are continuously displayed at the position of the pen tip portion 12 on the display area of the display panel 21 so as to follow movement of the pen tip portion 12 of the digital pen 10. At the end, a character corresponding to the trajectory of the pen tip portion 12 of the digital pen 10 is displayed on the display panel 21 of the display device 20.

On the other hand, in step S16, when the pressure sensor 13 detects no pressure, the pen-side microcomputer 16b determines that the pen input performed by the user has not continued, and the process is ended.

As described above, the display device 20 displays, on the display panel 21, the trajectory of the tip of the digital pen 10 on the display panel 21. By so doing, it is possible to perform a handwriting input on the display panel 21 with the digital pen 10.

It should be noted that the case has been described above in which a character is written, but the use of the display control system 100 is not limited thereto. Needless to say, other than characters (numbers etc.), it is possible to write symbols, figures, and the like. In addition, it is also possible to delete a character, a figure, or the like displayed on the display panel 21 by using the digital pen 10 like an eraser. In other words, the display device 20 continuously deletes a display image at the position of the tip of the digital pen 10 on the display panel 21 so as to follow movement of the tip of the digital pen 10, whereby it is possible to delete the display image at the portion corresponding to the trajectory of the tip of the digital pen 10 on the display panel 21. Furthermore, it is also possible to move a cursor displayed on the display panel 21 or select an icon displayed on the display panel 21, by using the digital pen 10 like a mouse. In other words, it is possible to operate a graphical user interface (GUI) by using the digital pen 10. As described above, in the display control system 100, an input to the display device 20 is performed in accordance with a position, on the display panel 21, which is pointed to by the digital pen 10, and the display device 20 performs various display control in accordance with the input.

[6. Material of Dots]

Each dot 42 can be formed from a material that transmits visible light (light having a wavelength of 400 to 700 nm) and absorbs infrared light (light having a wavelength of 700 nm or longer). Each dot 42 is formed from, for example, a material that absorbs infrared light having a wavelength of 800 nm or longer. Specifically, each dot 42 is formed from a material having a transmittance of 90% or higher for visible light and a transmittance of 50% or lower (e.g., 20% or lower) for infrared light. For example, each dot 42 may be formed from a material having a transmittance of 10% or lower for infrared light.

Examples of such materials include diimmonium-based compounds, phthalocyanine-based compounds, and cyanine-based compounds. These materials may be used singly or may be mixed and used. A diimmonium salt-based compound is preferably included as a diimmonium-based compound. The diimmonium salt-based compound absorbs a large amount of light in the near-infrared range, has a wide range of absorption, and has a high transmittance for light in the visible light range. As the diimmonium salt-based compound, a commercially available product may be used, and, for example, KAYASORB series (Kayasorb IRG-022, IRG-023, IRG-024, etc.) manufactured by Nippon Kayaku Co., Ltd. and CIR-1080, CIR-1081, CIR-1083, CIR-1085, etc. manufactured by Japan Carlit Co., Ltd. are preferred. As a cyanine-based compound, a commercially available product may be used, and, for example, TZ series (TZ-103, TZ-104, TZ-105, etc.) manufactured by ADEKA Corporation and CY-9, CY-10, etc. manufactured by Nippon Kayaku Co., Ltd. are preferred.

The case has been described above in which each dot 42 absorbs infrared light (has a low transmittance for infrared light). However, each dot 42 may be formed so as to diffusely reflect infrared light. In such a case, infrared light incident on the optical film 40 from the outside of the display panel 21 is diffusely reflected on each dot 42, and thus part thereof surely reaches the image sensor 15b. The digital pen 10 is allowed to recognize the reflected light from each dot 42. On the other hand, the region between each dot 42 specularly reflects infrared light. From the region between each dot 42, almost no infrared light reaches the image sensor 15b. An optical image in which a dot pattern is represented in white is captured by the image sensor 15b.

[7. Material of Sheet Member]

The sheet member 43 according to the present embodiment is formed from a material having substantially the same refractive index as that of the material forming the dots 42. In other words, the sheet member 43 is formed from a material having the same refractive index as that of the material of the dots 42, or a material whose difference in refractive index from the material of the dots 42 is very small. Hereinafter, the reason for such a configuration will be described. It should be noted that when the sheet member 43 is formed from a material whose difference in refractive index from the material of the dots 42 is very small, the refractive index of the sheet member 43 may be higher or lower than the refractive index of each dot 42.

First, a case will be considered in which the PET film 41 on which the dots 42 are formed is attached on the polarizing filter 26a by an adhesive whose refractive index is different from that of the material forming the dots 42 to some extent.

In the case with such a configuration, due to the difference in refractive index between each dot 42 and an adhesive layer formed of the adhesive, light is refracted at the interface between each dot 42 and the adhesive layer. In addition, the surface of each dot 42 may be formed as a curved surface when being strictly seen. In such a case, the dots 42 have a function as a lens. Since a plurality of the dots 42 are arranged on the PET film 41, such light refraction and lens function occur over the entire surface of the PET film 41. Moreover, the dots 42 are periodically arranged at regular pitches to some extent. Thus, for example, when the dots 42 overlap the black matrix of the color filter 30, there is a concern that moiré (interference fringes) occurs.

Light emitted from the display panel 21 is influenced by the PET film 41 as described above. Thus, it becomes difficult for the viewer to appropriately view an image or characters displayed on the display panel 21.

Here, Japanese Laid-Open Patent Publication No. 2009-037312 describes a transparent sheet that allows moiré to be reduced to such an extent that image recognition is not impaired. In the transparent sheet, the difference between the refractive index of the dot pattern (transparent pattern) and the refractive index of the transparent layer having substantially the same thickness as that of the dot pattern is equal to or less than 0.14. In addition, about 4 µm is described as the film thickness of the dot pattern in the EXAMPLES of Japanese Laid-Open Patent Publication No. 2009-037312.

However, in the transparent sheet described in Japanese Laid-Open Patent Publication No. 2009-037312, when visible light is transmitted through the dot pattern, there is a concern that a Becke line described later decreases the visibility of an image. Although described in detail later, the Becke line is a bright line occurring on the interface between substances. Regarding the Becke line, when visible light is transmitted through the dot pattern, the amplitude of an illumination distribution of the Becke line is increased as the phase difference between light transmitted through the dot and light transmitted through the transparent layer between the dots is increased. In the case of the transparent sheet described in Japanese Laid-Open Patent Publication No. 2009-037312, this phase difference is 1.611 and quite high.

Thus, in the present embodiment, the refractive index difference is further decreased to be smaller than that in the transparent sheet described in Japanese Laid-Open Patent Publication No. 2009-037312, and the refractive index of the material forming the dots 42 and the refractive index of the material forming the sheet member 43 are made substantially the same. Due to such a configuration, the refractive index difference between each dot 42 and the sheet member 43 is eliminated or very small. Therefore, a layer having substantially uniform refractive index is formed on the PET film 41. As a result, it is possible to reduce the influence of the Becke line to improve the visibility of an image as described later.

As such a material of the sheet member 43, for example, a material that is different from the material of the dots 42 and has substantially the same refractive index as that of the material of the dots 42 may be used. In addition, a material obtained by removing a component that absorbs infrared light (a component having a low transmittance for infrared light) from the material of the dots 42 may be used as the material of the sheet member 43.

In addition, the sheet member 43 is preferably formed from a material having an infrared absorption rate different from that of the dots 42. The sheet member 43 is preferably formed from a material having a high transmittance for infrared light. Due to such a configuration, it is made possible for the digital pen 10 to accurately read the dots 42.

Figure 8:
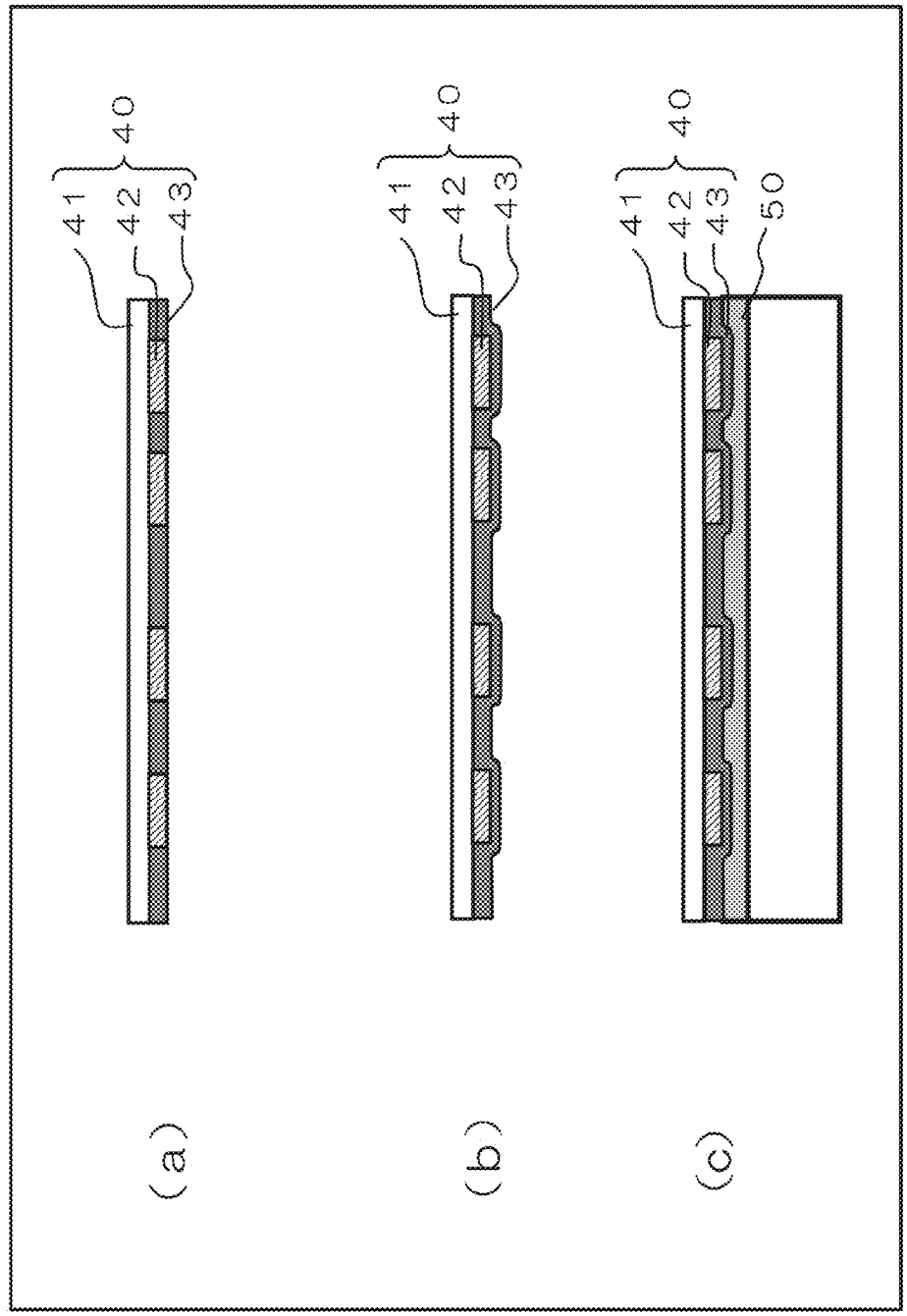
FIG. 8 is a cross-sectional view showing a variation of the optical film 40.

FIG. 8 is a cross-sectional view showing a variation of the optical film 40. As shown in FIG. 8(a), in the optical film 40, a surface formed of the dots 42 and the sheet member 43 may be made into a flat surface by filling only the spaces between the dots 42 with the sheet member 43. The thicknesses of the dots 42 and the sheet member 43 are the same. In addition, as shown in FIG. 8(b), in the optical film 40, the sheet member 43 may be formed along the shapes of the PET film 41 and the dots 42 (the shapes of the lower surfaces in FIG. 8(b)). In this case, the sheet member 43 has a projection shape at a position corresponding to each dot 42. If the amount by which the projection-shaped portion of the sheet member 43 projects is sufficiently smaller than the thickness of each dot 42, it is possible to reduce occurrence of the above-described problems. When the optical film 40 shown in FIG. 8(b) is attached onto a liquid crystal panel, the optical film 40 is preferably attached thereon via an adhesive layer 50 as shown in FIG. 8(c). Here, when the sheet member 43 is attached directly on a liquid crystal panel, the sheet member 43 needs to have an adhesive function while having a desired refractive index. Thus, the range of choices for the material of the sheet member 43 is narrowed. However, when the adhesive layer 50 is provided additionally as shown in FIG. 8(c), an adhesive function is not required for the sheet member 43, and thus the range of choices for the material of the sheet member 43 is expanded.

In the present embodiment, when visible light having a wavelength of 700 nm is transmitted through the dots 42 and the sheet member 43, the phase difference between light transmitted through each dot 42 and light transmitted through the sheet member 43 is made equal to or less than Π/6. The phase difference is a value obtained when light is transmitted through the dots 42 and the sheet member 43 perpendicularly to the dots 42 and the sheet member 43. The reason for such a configuration will be described below.

Figure 9:
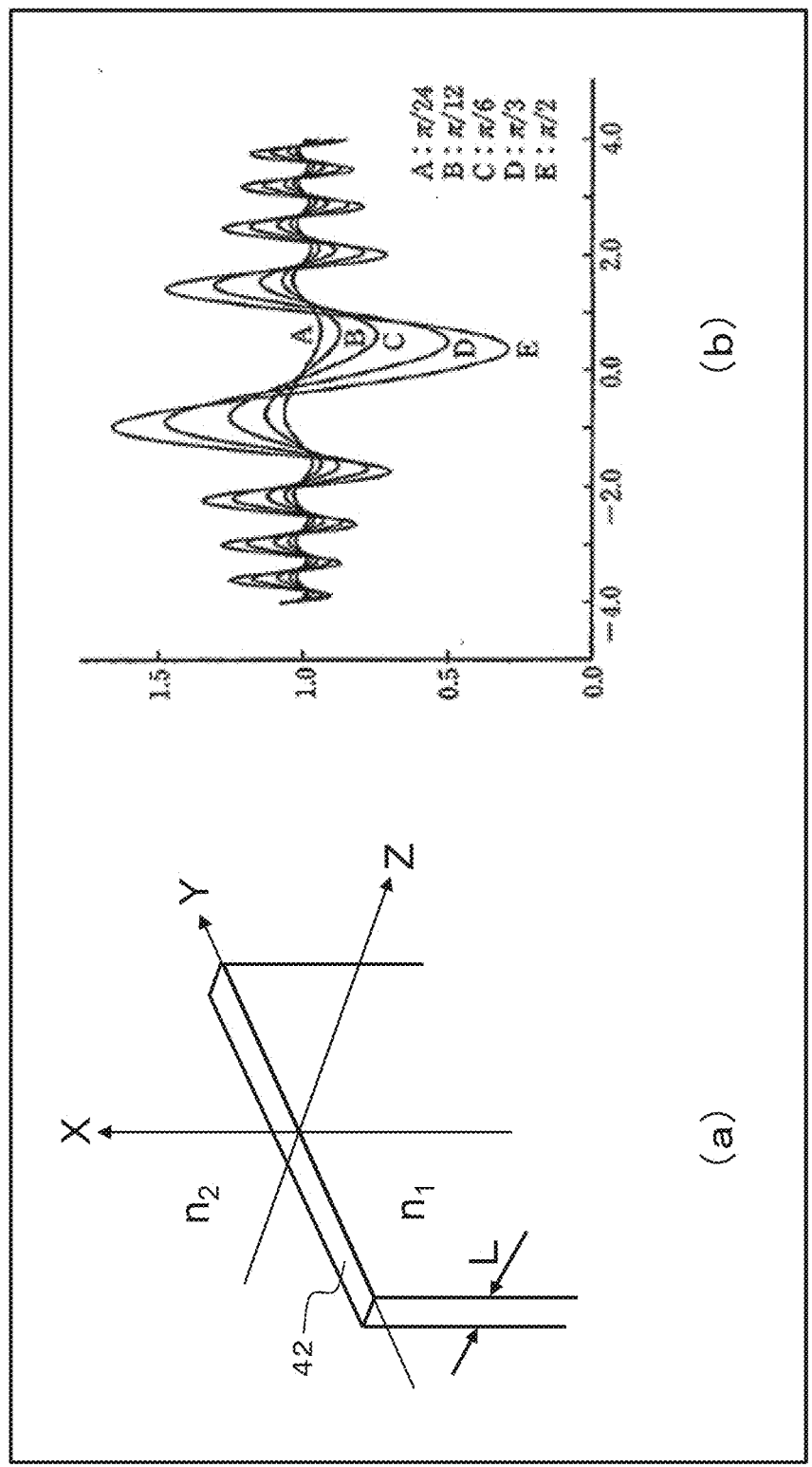
FIG. 9($a$) is a schematic diagram for explaining a diffraction phenomenon by a knife-edge method.

FIG. 9($a$) is a schematic diagram for explaining a diffraction phenomenon by a phase knife edge, and FIG. 9($b$) is a graph for explaining a relationship between a phase difference of light and the amplitude of an illumination distribution of a Becke line. For these diagrams, reference is made to "Oyo Kogaku (Applied Optics) I", written by Tadao Tsuruta, published by Baishukan Co., Ltd.

As shown in FIG. 9($a$), it is assumed that the refractive index of the dot 42 is $n_1$, the thickness of the dot 42 is L, and the sheet member 43 having a refractive index $n_2$ is present around the dot 42. When light is applied to the dot 42 and the sheet member 43, a line of light (bright line) called a Becke line appears on the interface between the dot 42 and the sheet member 43. When the amplitude of the illumination distribution of the Becke line is increased, the viewer visually recognizes the Becke line, and the visibility of an image on the display panel 21 is deteriorated. The amplitude of the illumination distribution of the Becke line depends on a phase difference of light as shown in FIG. 9($b$). In the graph of FIG. 9($b$), A represents an illumination distribution when the phase difference is Π/24, B represents an illumination distribution when the phase difference is Π/12, C represents an illumination distribution when the phase difference is Π/6, D represents an illumination distribution when the phase difference is Π/3, and E represents an illumination distribution when the phase difference is Π/2. As shown in FIG. 9($b$), it is recognized that the smaller the phase difference is, the smaller the amplitude of the illumination distribution of the Becke line is; and that the larger the phase difference is, the larger the amplitude of the illumination distribution of the Becke line is.

Here, when the phase difference between light transmitted through the dot 42 and light transmitted through the sheet member 43 is W and the wavelength of the light is λ, the following equation is met. The phase difference W of the light is the same as a phase difference when visible light having the same wavelength is transmitted through the dot 42 and the sheet member 43.

$$W = L \times (n_1 - n_2)/\lambda \quad (1)$$

Since the observed wavelength is a wavelength of visible light, the value of λ is set as 0.55 μm. In addition, when the thickness L of the dot 42 is set as 9 μm, regarding the refractive index difference Δn ($=n_1-n_2$) in the case with each of the phase differences A to E in FIG. 9($b$), Δn is 0.00125 at the phase difference A ($=\Pi/24$), Δn is 0.0025 at the phase difference B ($=\Pi/12$), Δn is 0.005 at the phase difference C ($=\Pi/6$), Δn is 0.001 at the phase difference D ($=\Pi/3$), and Δn is 0.03 at the phase difference E ($=\Pi/2$).

As is obvious from FIG. 9($b$), when the phase difference is D ($=\Pi/2$) or E ($=\Pi/3$), the amplitude of the illumination distribution of the Becke line is large. Thus, the visibility of an image on a display panel is deteriorated. Meanwhile, when the phase difference is small such as A ($=\Pi/24$), B ($=\Pi/12$), or C ($=\Pi/6$), the amplitude of the illumination distribution of the Becke line is sufficiently small, and thus it is possible to suppress reduction of the visibility of an image on the display panel.

Thus, in the present embodiment, when infrared light (a wavelength of 700 nm) is transmitted through the optical film 40 perpendicularly to the optical film 40 (in the thickness direction of the dot pattern), the phase difference between light transmitted through each dot 42 and light transmitted through the sheet member 43 is made equal to or less than Π/6. In addition, the refractive index difference is 0.0058 when the phase difference is Π/6, and thus it is possible to reduce the amplitude of the illumination distribution of the Becke line by causing the difference between the refractive index of the dot 42 and the refractive index of the sheet member 43 to be equal to or less than 0.005. It should be noted that in the present embodiment, a refractive index difference of 0.05 or less is included in the range where the refractive index differences are substantially the same.

[8. Summary of Embodiment]

As described above, the optical film 40 according to the present embodiment includes the PET film 41 (an example of a base material), the dot patterns (an example of an information pattern), and the sheet member 43. Each dot pattern is provided on one surface of the PET film 41 and composed of a plurality of the dots 42 (an example of marks). The sheet member 43 is formed so as to fill the spaces between a plurality of the dots 42. When visible light having a wavelength of 700 nm is transmitted through each dot 42 and the sheet member 43, the phase difference between light transmitted through each dot 42 and light transmitted through the sheet member 43 is made equal to or less than Π/6.

Due to such a configuration, it is possible to suppress occurrence of a line of light (Becke line) on the interface between the dot 42 and the sheet member 43. As a result, the viewer is allowed to appropriately view an image or characters. In addition, due to such a configuration, a layer having substantially the same refractive index is formed on the PET film 41, and thus moiré is less likely to occur even when the dots 42 overlap the black matrix of the color filter 30 or the like. As a result, the viewer is allowed to view an appropriate image or characters.

EXAMPLES

Hereinafter, examples will be described.

Example 1

A material (refractive index: 1.578) that absorbs infrared light and transmits visible light was prepared as the material of dots, and a dot pattern was formed on a transparent substrate. The thickness of each dot was set as 9 μm. Next, a contact liquid $n_d$=1.58 (manufactured by Shimadzu Corporation, refractive index: 1.5819) was applied onto the dots, and the transparent substrate was placed on a liquid crystal panel. Specifically, a state was created in which the contact liquid was interposed between the liquid crystal panel and the transparent substrate on which the dot pattern was formed. The refractive index difference Δn between each dot and the sheet member is 0.0039. When the sample produced thus was observed with a microscope, no Becke line was recognized through visual examination. In other words, the sample of Example 1 was excellent in visibility. It should be noted that also in the case where the refractive index difference Δn was 0.005 and the thickness of each dot was 10 μm, no Becke line was recognized through visual examination.

Comparative Example 1

Similarly to Example 1, a material (refractive index: 1.578) that absorbs infrared light and transmits visible light was prepared as the material of dots, and a dot pattern was formed on a transparent substrate. Similarly to Example 1, the thickness of each dot was set as 9 μm. Next, a contact liquid $n_d=1.61$ (manufactured by Shimadzu Corporation, refractive index: 1.615) was applied onto the dots, and the transparent substrate was placed on a liquid crystal panel. The refractive index difference Δn between each dot and the sheet member is 0.037. When the sample produced thus was observed with a microscope, Becke lines were visually recognized on the interfaces between the dots and the sheet member.

Comparative Example 2

Similarly to Example 1, a material (refractive index: 1.578) that absorbs infrared light and transmits visible light was prepared as the material of dots, and a dot pattern was formed on a transparent substrate. Similarly to Example 1, the thickness of each dot was set as 9 μm. Next, a contact liquid $n_d=1.56$ (manufactured by Shimadzu Corporation, refractive index: 1.56) was applied onto the dots, and the transparent substrate was placed on a liquid crystal panel. The refractive index difference Δn between each dot and the sheet member is 0.018. When the sample produced thus was observed with a microscope, Becke lines were visually recognized on the interfaces between the dots and the sheet member.

Embodiment 2

Whereas the sheet member 43 is formed directly on the dots 42 in Embodiment 1, an intermediate layer 60 is formed between the dots 42 and the sheet member 43 in the present embodiment, which is the difference from Embodiment 1. Hereinafter, the difference from Embodiment 1 will be mainly described.

Figure 10:
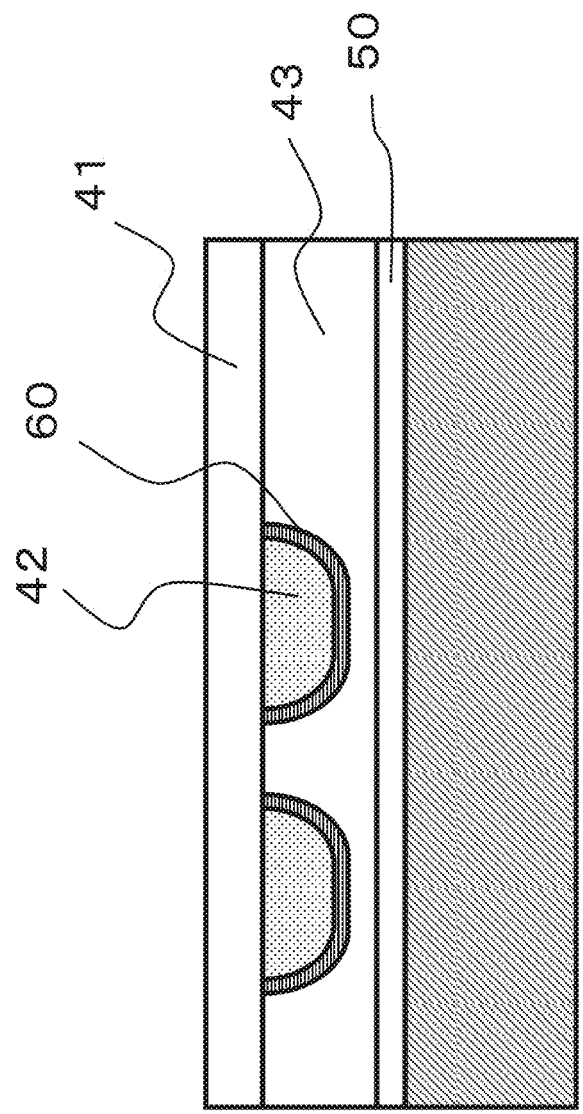
FIG. 10 is a cross-sectional view for explaining a display panel according to Embodiment 2.

FIG. 10 is a cross-sectional view of a display panel 21 according to Embodiment 2. As shown in FIG. 10, the optical film 40 includes the intermediate layer 60 between the dots 42 and the sheet member 43. The refractive index of the intermediate layer 60 is a value between the refractive index of each dot 42 and the refractive index of the sheet member 43. Specifically, the refractive index is lower or higher in order of the dots 42, the intermediate layer 60, and the sheet member 43.

Due to such a configuration, an amount of change in refractive index near the edge of each dot 42 is decreased, and thus it is possible to suppress occurrence of a Becke line similarly to Embodiment 1. As a result, it is possible to improve the visibility of an image on the display panel 21.

In addition, the refractive index of the intermediate layer 60 preferably has such a refractive index distribution that the refractive index is continuously changed, not a uniform value, in the thickness direction of this layer. The refractive index of the intermediate layer 60 is preferably continuously changed from the dot 42 side to the sheet member 43 side such that the refractive index becomes close to the refractive index of the sheet member 43 from a value close to the refractive index of the dot 42. Due to such a configuration, it is possible to further reduce the refractive index differences at the interface between each dot 42 and the intermediate layer 60 and at the interface between the intermediate layer 60 and the sheet member 43. Thus, it is possible to further improve the visibility of an image on the display panel 21.

Other Embodiments

As described above, Embodiments 1 and 2 have been described as an illustrative example of the technology disclosed in the present application. However, the technology in the present disclosure is not limited thereto, and is also applicable to embodiments in which changes, substitutions, additions, omissions, and/or the like are made as appropriate. In addition, each constituent element described in the above Embodiments 1 and 2 can be combined to provide a new embodiment.

Other embodiments will be described below.

The above embodiments have been described with the liquid crystal display as an example of the display device, but the display device is not limited thereto. The display device 20 may be a device capable of displaying characters or video, such as a plasma display, an organic EL display, or an inorganic EL display. In addition, the display device 20 may be a device whose display surface is freely deformed, such as electronic paper.

In addition, the display device 20 may be a display of a notebook PC or a portable tablet. Furthermore, the display device 20 may be a television, an electronic whiteboard, or the like.

The digital pen 10 or the display device 20 may include a switching section that switches a process to be performed in accordance with an input of position information from the digital pen 10. Specifically, a switch may be provided in the digital pen 10 and may be configured to be switchable among input of characters or the like, deletion of characters or the like, movement of a cursor, selection of an icon, and the like. In addition, icons for switching among input of characters or the like, deletion of characters or the like, movement of a cursor, selection of an icon, and the like may be displayed on the display device 20 and may be selectable by using the digital pen 10. Furthermore, a switch corresponding to a right click or a left click of a mouse may be provided in the digital pen 10 or the display device 20. By so doing, it is possible to further improve the operability of the GUI.

Figure 11:
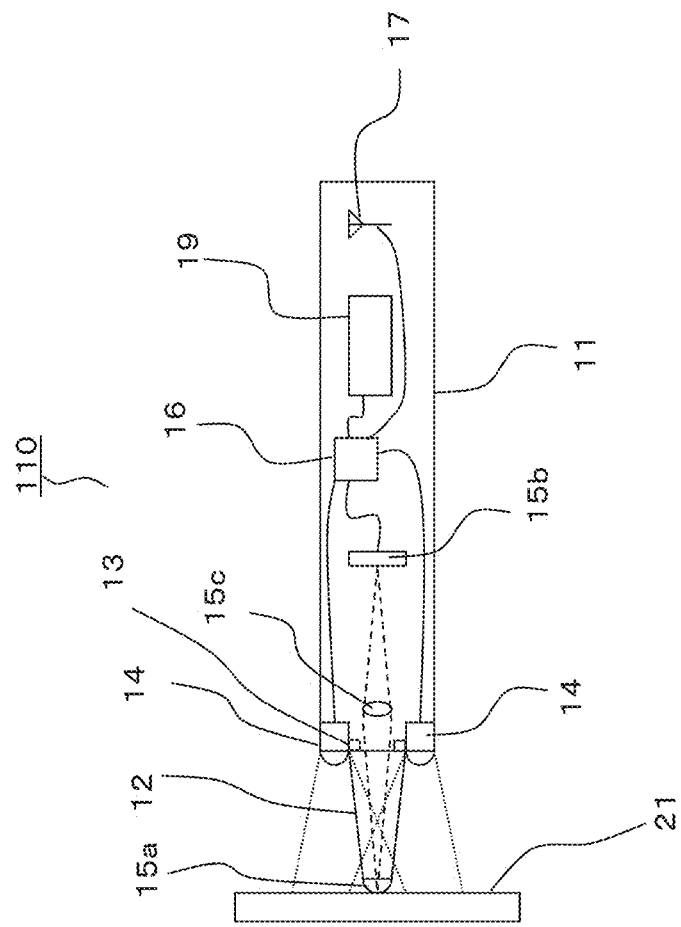
FIG. 11 is a cross-sectional view showing a schematic configuration of a digital pen 110 according to another embodiment.

The configurations of the digital pen 10 and the display device 20 are examples, and the present disclosure is not limited thereto. FIG. 11 is a schematic cross-sectional view of a digital pen 110 according to another embodiment. For example, in the digital pen 110 shown in FIG. 11, the pen tip portion 12 is formed from a material that is able to transmit infrared light. The objective lens 15a is provided within the tip of the pen tip portion 12. The reading section 15 further includes a lens 15c within the body case 11, and the objective lens 15a and the lens 15c constitute an optical system. A plurality of (e.g., four) irradiation sections 14 are arranged at an end of the body case 11 so as to surround the pen tip portion 12. The number of the irradiation sections 14 may be set as appropriate. In addition, a single ring-shaped light may be provided as an irradiation section 14 so as to surround the pen tip portion 12. With this configuration, a point where the digital pen 110 comes into contact with the display panel 21 substantially coincides with the position of the lens 15a of the reading section 15 which reads a dot pattern. Thus, it is possible to more accurately detect the position of the tip of the pen tip portion 12. As a result, the user is allowed to perform a handwriting input with the digital pen 110 as if actually writing with a pen.

Transmission and reception of signals between the digital pen 10 and the display device 20 are performed by means of wireless communication, but are not limited thereto. The digital pen 10 and the display device 20 may be connected to each other via a wire, and transmission and reception of signals may be performed via the wire therebetween.

Figure 12:
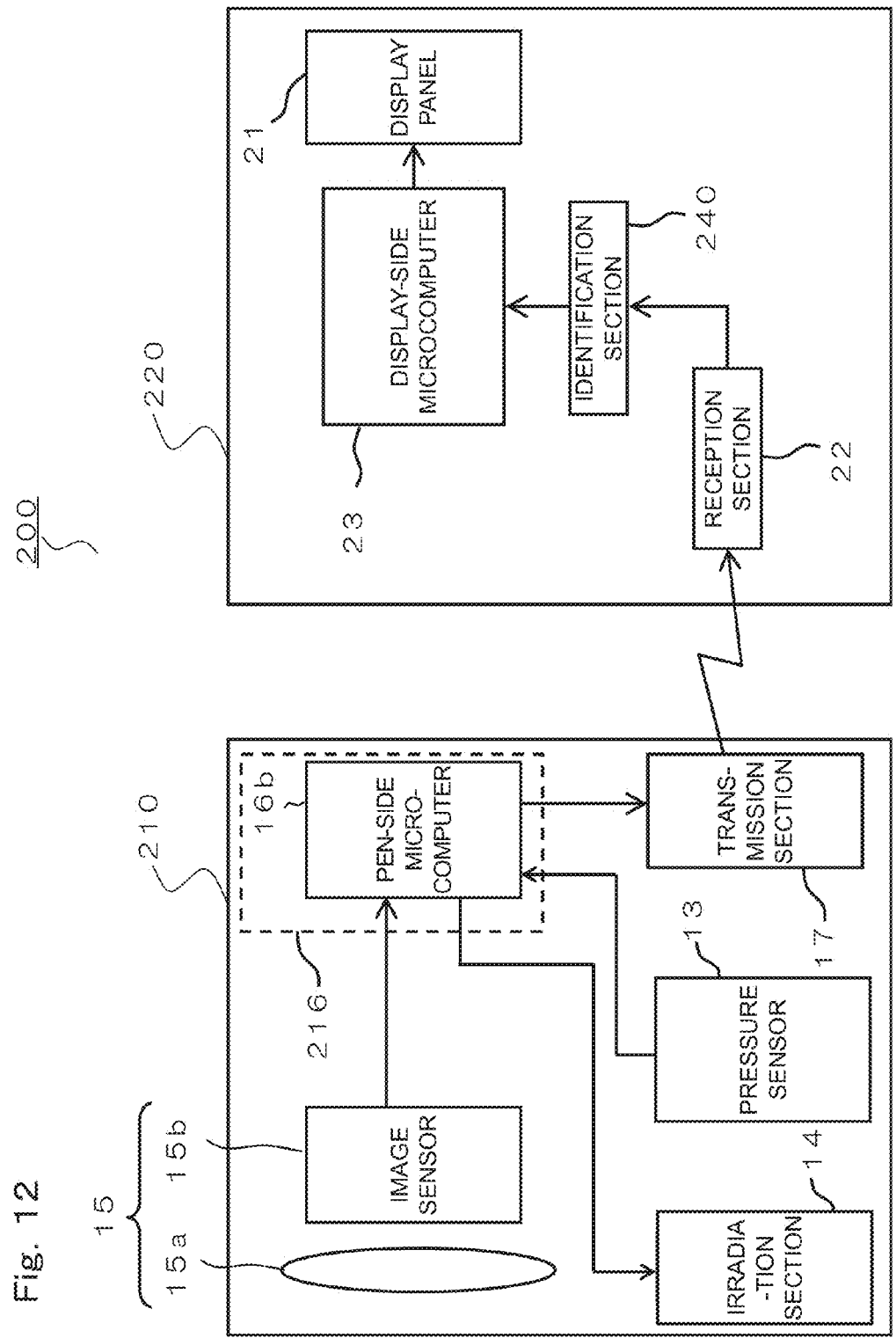
FIG. 12 is a block diagram of a display control system 200 according to another embodiment.
Figure 13:
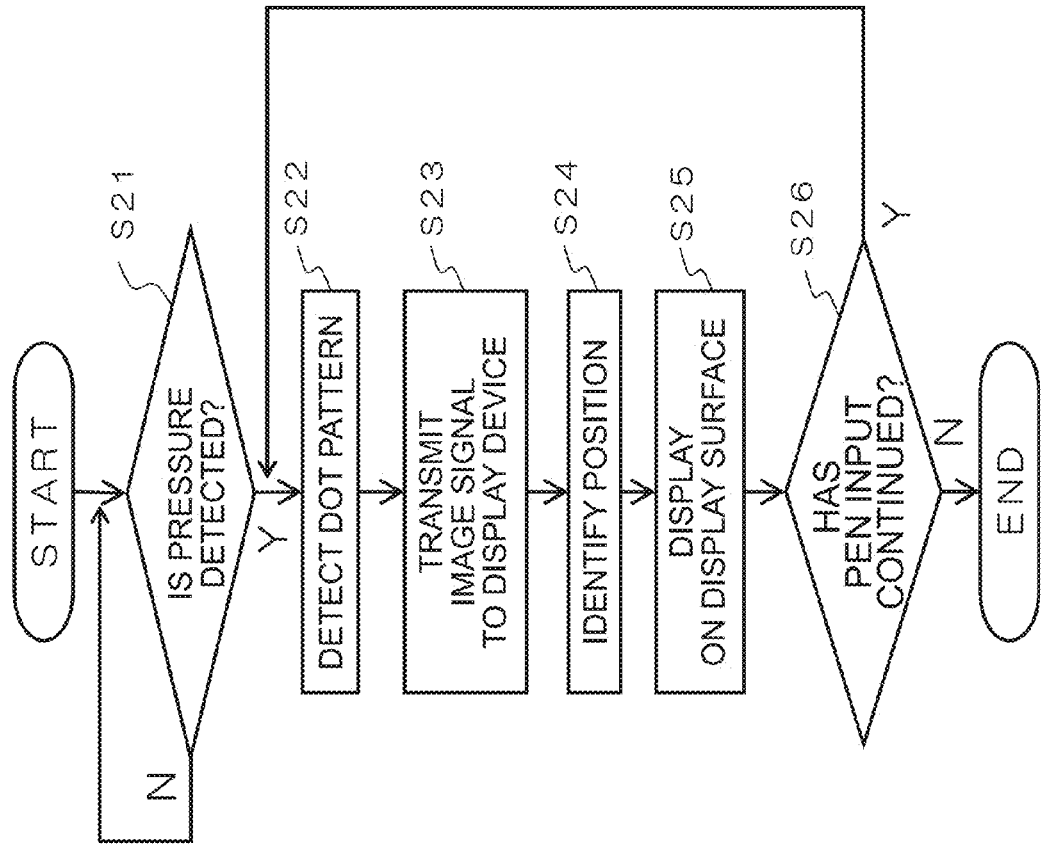
FIG. 13 is a flowchart showing flow of a process of the display control system 200.

In Embodiment 1, the digital pen 10 identifies position information and transmits the position information to the display device 20, but the present disclosure is not limited thereto. FIG. 12 is a block diagram of a display control system 200 according to another embodiment. A digital pen 210 shown in FIG. 12 includes a pressure sensor 13, an irradiation section 14, a reading section 15, a control section 216, and a transmission section 17. The configurations of the pressure sensor 13, the irradiation section 14, the reading section 15, and the transmission section 17 are the same as those in Embodiment 1. The control section 216 includes a pen-side microcomputer 16b and does not include the identification section 16a in Embodiment 1. In other words, the control section 216 outputs an image signal inputted from an image sensor 15b, to the transmission section 17 without identifying position information of the digital pen 210 from the image signal. Thus, the image signal obtained by the image sensor 15b is transmitted from the digital pen 210. A display device 220 shown in FIG. 12 includes a reception section 22 that receives a signal from an external device, a display-side microcomputer 23 that controls the entirety of the display device 220, a display panel 21 that displays an image, and an identification section 240 that identifies the position of the digital pen 10. The configurations of the reception section 22, the display-side microcomputer 23, and the display panel 21 are the same as those in Embodiment 1. A plurality of dot patterns are formed in the display panel 21. The reception section 22 receives an image signal transmitted from the digital pen 210 and transmits the received image signal to the identification section 240. The identification section 240 has the same function as that of the identification section 16a of the digital pen 10 in Embodiment 1. With this configuration, as shown in FIG. 13, the digital pen 210 obtains an image of a dot pattern with the image sensor 15b (step S22), and the image signal is transmitted from the digital pen 210 to the display device 220 (step S23). Then, the identification section 240 of the display device 220 identifies the position of the digital pen 210 from the image signal received from the digital pen 210 (step S24). The other processes are the same as in Embodiment 1.

It should be noted that in the digital pen 210 of the display control system 200, after an image of a dot pattern is obtained, image processing may be performed to reduce an amount of data, and then a signal resulting from the image processing may be transmitted to the display device 220. In other words, as long as the digital pen 10, 110, or 210 captures an image of a dot pattern representing information regarding a position, on the display panel 21, which is pointed to by the digital pen 10, 110, or 210, information regarding the position on the display panel 21 may be transmitted in any form from the digital pen 10, 110, or 210 to the display device 20 or 220. The display device 20 or 220 performs various display control in accordance with the received information regarding the position.

The identification section that identifies the position of the digital pen on the display panel 21 may be provided as a control device independent of the digital pen 10 and the display device 20. For example, in a display control system in which a digital pen is added to a desktop PC including a display (an example of a display device) and a PC body (an example of a control device), the digital pen may optically read a dot pattern formed in a display panel of the display and may transmit the dot pattern to the PC body. Then, the PC body may identify the position of the digital pen from the dot pattern and may instruct the display to perform a process corresponding to the identified position.

In the above embodiments, the pressure sensor 13 is used only for determining whether a pressure is applied, but the present disclosure is not limited thereto. For example, the magnitude of a pressure may be detected on the basis of a detection result of the pressure sensor 13. By so doing, it is possible to read continuous change in the pressure. As a result, on the basis of the magnitude of the pressure, it is possible to change the thickness or the color density of a line to be displayed through a pen input.

In the above embodiments, presence/absence of an input with the digital pen 10 is detected with the pressure sensor 13, but the present disclosure is not limited thereto. A switch that switches between ON and OFF of a pen input may be provided in the digital pen 10, and when the switch is turned ON, it may be determined that a pen input is present. In such a case, even when the digital pen 10 is not in contact with the surface of the display panel 21, it is possible to perform a pen input. Alternatively, the display device 20 may vibrate the display surface of the display panel 21 at a determined vibration frequency. In such a case, the display device 20 detects presence/absence of a pen input by detecting change in the vibration frequency which is caused by contact of the digital pen 10 with the display surface of the display panel 21.

In the above embodiments, each pixel region of the display panel 21 is rectangular, but is not limited thereto. Each pixel region may have a shape such as a triangle or a parallelogram, or may have a shape obtained by combining them. Each pixel region may have any shape as long as the display device is able to output characters or video. In addition, the black matrix may be changed as appropriate in accordance with the shape of each pixel region.

In the above embodiments, each dot 42 is arranged on the first reference line 44 or the second reference line 45. However, as shown in FIG. 14, each dot 42 may be arranged at a position off-set (shifted) from the intersection of the first reference line 44 and the second reference line 45 in an oblique direction with respect to the first reference line 44 and the second reference line 45.

The arrangement pattern of each dot 42 is not limited thereto. Any method may be used for coding of each dot pattern, and thus the arrangement pattern of each dot 42 may be changed in accordance with the used coding method.

Regarding the first reference lines 44 and the second reference lines 45 for arranging the dots 42, for example, the first reference lines 44 may be defined on the black matrix or may be defined on the pixel regions. Furthermore, it is possible to arbitrarily select what color of pixel regions the first reference lines 44 are defined on. The same applies to the second reference lines 45.

In the above embodiments, each dot pattern is formed in a unit area of 6 dots×6 dots, but is not limited thereto. The number of the dots constituting a unit area may be set as appropriate in accordance with the designs of the digital pen 10 and the display device 20. In addition, the configuration of each dot pattern is not limited to the combination of the arrangements of dots included in a determined area. The coding method is not limited to that in the above embodiments as long as each dot pattern is able to represent specific position information.

In the above embodiments, each information pattern is composed of a plurality of dots, but is not limited thereto. Each information pattern may be composed of a plurality of marks represented by figures such as triangles or characters such alphabets, instead of the dots. For example, each mark may be formed over the entirety of the pixel region.

The dots 42 may be provided on the color filter 30 together with the sheet member 43. The dots 42 may be provided on the glass substrate 25 or the polarizing filter 26 as long as they are located at positions corresponding to the sub-pixels. Alternatively, it is possible to represent the dots 42 by pixels of the display panel 21. In other words, a configuration where the dots 42 are provided in the display panel 21 may be realized by controlling display of pixels or sub-pixels at positions corresponding to the above "1" to "4".

The identification section 16a transforms a dot pattern to a position coordinate by calculation, but the present disclosure is not limited thereto. For example, the identification section 16a may previously store all dot patterns and position coordinates associated with the respective dot patterns and may identify a position coordinate by checking an obtained dot pattern against the relationships between the stored dot patterns and position coordinates.

As presented above, the embodiments have been described as an example of the technology according to the present disclosure. For this purpose, the accompanying drawings and the detailed description are provided.

Therefore, components in the accompanying drawings and the detail description may include not only components essential for solving problems, but also components that are provided to illustrate the above described technology and are not essential for solving problems. Therefore, such inessential components should not be readily construed as being essential based on the fact that such inessential components are shown in the accompanying drawings or mentioned in the detailed description.

Further, the above described embodiments have been described to exemplify the technology according to the present disclosure, and therefore, various modifications, replacements, additions, and omissions may be made within the scope of the claims and the scope of the equivalents thereof.

What is claimed is:

1. An optical film comprising:
   a sheet-shaped base material;
   an information pattern including a plurality of marks provided on one surface of the base material and representing information regarding a position thereof on the optical film; and
   a sheet member laminated on the surface of the base material on which the information pattern is provided, so as to fill spaces between the plurality of marks, wherein
   when visible light having a wavelength of 700 nm is transmitted through the information pattern in a thickness direction of the information pattern, a phase difference between light transmitted through each mark and light transmitted through the sheet member between the marks is equal to or less than $\Pi/6$.

2. The optical film according to claim 1, wherein, when visible light having a wavelength of 400 nm is transmitted through the information pattern in the thickness direction of the information pattern, a phase difference between light transmitted through each mark and light transmitted through the sheet member between the marks is equal to or less than $\Pi/6$.

3. The optical film according to claim 1, wherein a difference between a refractive index of each mark and a refractive index of the sheet member is equal to or less than 0.005.

4. The optical film according to claim 1, wherein a thickness of each mark is equal to or larger than 5 μm.

5. An optical film comprising:
   a sheet-shaped base material;
   an information pattern including a plurality of marks provided on one surface of the base material and representing information regarding a position thereof on the optical film; and
   a sheet member laminated on the surface of the base material on which the information pattern is provided, so as to fill spaces between the plurality of marks, wherein
   a difference between a refractive index of each mark and a refractive index of the sheet member is equal to or less than 0.005.

6. The optical film according to claim 1, further comprising an intermediate layer formed between the sheet member and each mark, wherein
   a refractive index of the intermediate layer is a value between a refractive index of the sheet member and a refractive index of each mark.

7. A display panel comprising:
   a display panel main body configured to display an image; and
   the optical film according to claim 1, provided on the display panel main body.

8. A display device comprising the display panel according to claim 7.

* * * * *